United States Patent  [15] 3,674,884
Moritani et al.  [45] July 4, 1972

[54] PROCESS FOR THE PREPARATION OF AROMATIC HYDROCARBONS CONTAINING MONOETHYLENIC UNSATURATED RADICALS

[72] Inventors: Ichiro Moritani, Takaishi-shi; Yuzo Fujiwara, Oyonaka-shi, both of Japan

[73] Assignee: Ube Industriee, Ltd., Nishihonmachi, Ube-shi Yamaguchi-ken, Japan

[22] Filed: July 29, 1968

[21] Appl. No.: 748,222

[30] Foreign Application Priority Data

Aug. 4, 1967 Japan..................................42/49709

[52] U.S. Cl. ..........................260/669 R, 260/465, 260/497, 260/592, 260/595, 260/613, 260/645, 260/646, 260/651, 260/668 C, 260/671 A, 260/671 C

[51] Int. Cl.................................................C07c 15/10
[58] Field of Search..................260/669, 671, 671 A, 671 C, 260/671 B, 497, 497 A, 499, 668 C

[56] References Cited

UNITED STATES PATENTS 3,479,392  11/1969  Stern et al..............................260/497

Primary Examiner—Curtis R. Davis
Attorney—Wenderoth, Lind & Ponack

[57] ABSTRACT

Process for the preparation of aromatic hydrocarbon compounds containing monoethylenically unsaturated radicals, which comprises reacting a monoethylenically unsaturated compound with an aromatic hydrocarbon compound in the presence of a palladium salt.

10 Claims, No Drawings

PROCESS FOR THE PREPARATION OF AROMATIC HYDROCARBONS CONTAINING MONOETHYLENIC UNSATURATED RADICALS

This invention relates to a process for the preparation of aromatic hydrocarbons which contain monoethylenic unsaturated radicals, by the reaction of monoethylenically unsaturated compounds with aromatic hydrocarbons, in the presence of a palladium salt, such as palladium acetate.

It is known that the reaction of monoethylenically unsaturated hydrocarbons with aromatic hydrocarbons produces aromatic hydrocarbons which contain monoethylenically saturated hydrocarbon substituent, by the mechanism of an addition reaction. It is well known, for example, that ethylbenzene is formed from ethylene and benzene, and cumene, from propylene and benzene.

We discovered an entirely novel process of forming aromatic hydrocarbons containing monoethylenically unsaturated substituent, by reacting monoethylenically unsaturated compounds with aromatic hydrocarbons, in the presence of a palladium salt, as the result of our extensive researches on the art. In this novel reaction, the unsaturated radicals in the monoethylenically unsaturated compounds employed remain as they are after the compounds are bonded with aromatic hydrocarbons. Therefore, it appears that a substitution reaction takes place in this process, in contrast to the conventional addition reaction. Thus the subject reaction may hereinafter be referred to as substitution reaction.

Accordingly, the invention relates to a process for the preparation of aromatic hydrocarbons containing monoethylenic unsaturated radicals, by reacting a monoethylenically unsaturated compound with an aromatic hydrocarbon in the presence of a palladium salt, to perform an entirely novel substitution reaction between the two.

As the monoethylenically unsaturated compounds useful for the subject process, the following may be named:
the compounds of the formula

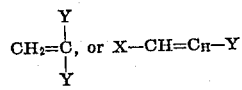

in which
X is selected from the group consisting of hydrogen, halogens, alkyls of one to four carbons, phenyl and alkyl-substituted phenyls; and
Y is selected from the group consisting of hydrogen, alkyls of one to four carbons, phenyl, alkyl-substituted phenyls, nitrile, alkoxies of one to four carbons, halogens, alkoxycarbonyls, and alkanoyloxies of two to four carbons:
and the compounds of the formula

in which
R is selected from alkylenes of three to ten carbons.

A more specific examples, the following monoethylenically unsaturated compounds are preferably used in the invention: ethylene, propylene, 1-butene, 2-butene, iso-butene, 1-pentene, styrene, α-methylstyrene, 4-methylstyrene, 1,1-diphenylethylene, trans-stilbene, cyclohexene, cyclooctene, acrylonitrile, vinyl butyl ether, vinyl ethyl ether, vinyl chloride, vinylidene chloride, vinyl fluoride, 1,2-dichloroethylene, acrylic acid ester of alkyl containing one to four carbons, methacrylic acid ester of alkyl containing one to four carbons, vinyl acetate, vinyl propionate, and the like.

The aromatic hydrocarbons useful for the invention can be represented by the formula

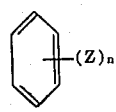

in which

Z is selected from the group consisting of hydrogen, alkyls of one to twelve carbons, nitro, halogens, alkoxies of one to twelve carbons, hydroxy, mono- and di-alkylaminos, acylamines, carboxyl, alkoxycarbonyls, and nitrile, and $n$ is 1 or 2.

Particularly preferred aromatic hydrocarbons include benzene, toluene, o- or m- or p-xylene, ethylbenzene, cumene, nonylbenzene, nitrobenzene, chlorobenzene, bromobenzene, anisole, butoxybenzene, phenol, resorcin, cresol, N-tert.-butylaminobenzene, N,N-dimethylaniline, acetanilide, benzoic acid, dimethyl terephathalate, benzonitrile, and the like.

The palladium salts useful for the invention include inorganic acid salts such as divalent palladium halides, nitrate and sulfate, and aliphatic monocarboxylates of one to five carbons. In the invention, particularly palladium acetate is preferred, while palladium formate, propionate, butyrate, and valerate are equally useful. When inorganic acid salts of palladium such as chloride, nitrate and sulfate are used, it is recommended that an alkali metal salt of an aliphatic monocarboxylic acid of one to five carbons, inter alia, sodium or potassium acetate, should be concurrently used, so that a palladium salt of the aliphatic monocarboxylic acid can be formed in the reaction system. In that case, it is preferred to use at least equivalent quantity, particularly 2 – 5 equivalents, of an alkali metal salt of the aliphatic monocarboxylic acid of one to five carbons, to the inorganic acid salt of palladium employed.

In accordance with the invention, it is preferred to use such a palladium salt in a quantity of at least one-fourth mol, particularly one-fourth to 1 mole, per mol of the monoethylenically unsaturated compound employed. The entire quantity of the palladium salt may be added to the reaction system at once in advance of the reaction, or a predetermined portion thereof may be first added in advance of the reaction and the rest may be added stepwise or continuously, as the reaction progresses.

The preferred quantity of the aromatic hydrocarbon in the reaction system is at least 2 mols, particularly 4 – 10 mols, per mol of the monoethylenically unsaturated compound, in order to prevent objectionable side reactions between the monoethylenically unsaturated compounds, such as dimerization.

In practicing the subject invention, it is discovered that the rate of the intended substitution reaction can be remarkably increased when the reaction is performed in an aliphatic monocarboxylic acid of one to five carbons, such as formic, acetic, monochloroacetic, trichloroacetic, trifluoroacetic, propionic, butyric, and valeric acids, etc. Therefore, it is generally preferred in practicing the subject invention, to employ those aliphatic monocarboxylic acids as the solvent.

It is of course permissible to perform the reaction using an excess of the above-described aromatic hydrocarbon, a part of which serves as the solvent, together with an aliphatic monocarboxylic acid.

The operational procedures of the reaction are not critical. Thus it is permissible, for example, to mix simultaneously or by optional order, the monoethylenically unsaturated compound, aromatic hydrocarbon and palladium salt (particularly palladium acetate, or a mixture which will form palladium acetate in the reaction system). Or, a complex from the monoethylenically unsaturated compound and palladium salt may be formed in advance, the complex then being mixed with an aromatic hydrocarbon. In all cases the reaction smoothly progresses and produces the corresponding aromatic hydrocarbon containing the monoethylenic unsaturated radicals.

Thus in one embodiment of the invention, a complex is formed in advance from an inorganic acid salt of palladium, particularly a halide or nitrate, or a aliphatic monocarboxylic acid salt of palladium, and the monoethylenically unsaturated compound. The complex, either alone or in combination with the monoethylenically unsaturated compound, is contacted with an aromatic hydrocarbon.

The reaction of this invention can be illustrated with general formulas as follows:

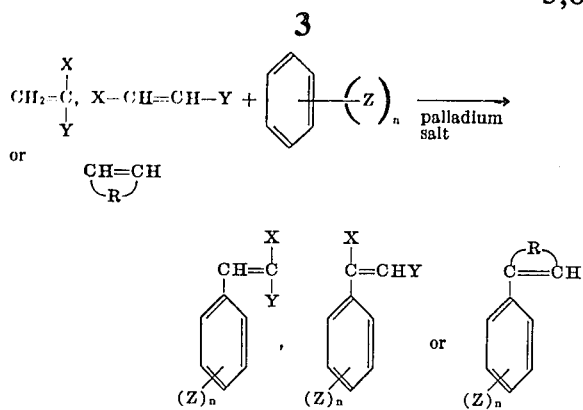

In the formulas above, X, Y, Z, R and n possess the same significance as defined in the foregoing.

The typical products of the above reaction will be named hereinbelow, in the purpose of explanation: styrene, α-methylstyrene, β-methylstyrene, α- and β-cyano-styrene, 1,2-diphenylethylene (stilbene), 1,1,2-triphenylethylene, 1,2-diphenylpropylene, 1-phenyl-2-tolylethylene, 1-phenylcyclohexene, β-butoxystyrene, β-chlorostyrene, β-dichlorostyrene, β-fluorostyrene, methyl cinnamate, α-methyl cinnanmic acid methyl ester, β-acetoxystyrene, 1-(2,5-dimethylphenyl)-2-phenylethylene, 1-(ethylphenyl)-2-phenylethylene, 1-(nitrophenyl)-2-tolylethylene, 1-(chlorophenyl)-2-phenylethylene, 1-(methoxyphenyl)-3-phenylethylene, 1-(oxyphenyl)-2-tolylethylene, 1-(dimethylaminophenyl)-2-phenylethylene, 1-(dimethoxycarbonylphenyl)-2-phenylethylene, and the like.

In practicing the subject invention, other reaction conditions vary considerably, depending on the specific types of monoethylenically unsaturated compound, aromatic hydrocarbon and palladium salt. Generally speaking, however, the reaction proceeds under temperatures ranging from room temperature to 200° C., particularly 60° – 100° C. The pressure condition is not critical, which may be atmospheric or elevated. The manner of reaction neither is critical, which may be performed batchwise or continuously.

The atmosphere of the reaction may be of the air, or of an inert gas such as nitrogen or carbon dioxide. In the invention, the progress of the reaction can be easily observed since metallic palladium precipitates as the reaction proceeds. Normally the sufficient reaction time is in the order of 30 minutes to 10 hours.

According to the process of this invention, the palladium salt remains after the reaction in the form of metallic palladium (palladium black) precipitate, which is subsequently separated and recovered. Separation of the object compound from the reaction mixture is performed by the means known per se. For example, preceding or after the recovery of palladium black from the reaction mixture, the unreacted monoethylenically unsaturated compound and aromatic compound, as well as aliphatic monocarboxylic acid if employed in the reaction, are distilled off the system, and thereafter the object product is recovered by distillation. Or, in case the object compound is normally in solid state, it may be recovered as crystals from the distillation residue. The object compound can be also recovered from the reaction mixture or from the distillation residue, by means of extraction.

Thus obtained object compound can be further purified if so desired, by such known means as distillation or recrystallization.

In the past, no process which achieves single-stage preparation of aromatic compound containing monoethylenic unsaturated radicals from monoethylenically unsaturated compound and aromatic compound is known. Whereas, according to the present invention, it is possible to directly produce aromatic compound containing monoethylenic unsaturated radicals from the reaction of a monoethylenically unsaturated compound with an aromatic hydrocarbon, in the presence of a palladium salt. Thus the invention provides an economically very advantageous process.

The object compounds obtained in accordance with the invention are valuable as monomeric materials for synthetic resins, materials for synthesis of organic compounds, and intermediates of dyestuffs and medicines. Thus they are used in the fields known per se, being utilized of their ethylenically unsaturated property.

The invention will be explained in further details, with reference to the following working examples.

Example 1

A 2-liter capacity, three-necked flask with a stirrer and reflux condenser was filled with 340 cc. of benzene, 80 cc. of acetic acid, 3.4 g. of styrene and 7.2 g. of palladium acetate, and the content was boiled under reflux for 6 hours with stirring. After termination of the reaction, the content of the flask was cooled, and whereby precipitated solid was filtered. From the filtrate, benzene was distilled off under atmospheric pressure, and then acetic acid, under a reduced pressure (30 mm Hg) by means of a water-jet pump, followed by further removal by distillation of β-acetoxystyrene at a pressure of 5 mm Hg. The distillation residue was crystalline, which was recrystallized from ethanol to yield 5.24 g. of a crystalline product having a melting point ranging 122° – 123° C. The product was identified to be trans-stilbene, by the results of ultraviolet and infrared absorption spectra tests and of mixed examination with pure trans-stilbene. The yield was 90 mol percent to the palladium acetate employed.

EXAMPLE 2

The reaction of Example 1 was repeated except that 7.2 g. of palladium acetate was replaced by 7.4 g. of palladium nitrate. The reaction product was treated in the manner similar to Example 1, and 3.9 g. of trans-stilbene was obtained. The yield was 68 mol percent to the palladium nitrate.

EXAMPLE 3

The reaction of Example 1 was repeated except that 340 cc. of benzene was replaced by the same quantity of toluene. The reaction liquid was cooled and the precipitated solid was filtered off. The filtrate was washed with water, de-watered and dried with Glauber's salt, removed of a portion of toluene at a reduced pressure and concentrated. Thus concentrated liquid was passed through a column packed with 100 g. of alumina, and the column was eluted with 500 cc. of petroleum ether and 170 cc. of diethyl ether. Thus 3.7 g. of a white crystalline product having a melting point ranging from 119° – 120° C. was obtained, which was identified to be trans-1-paramethylphenyl-2-phenylethylene. The yield was 58 mol percent to the palladium acetate.

EXAMPLE 4

Example 3 was repeated except that the 340 cc. of toluene was replaced by the same quantity of p-xylene. Thus. 3.2 g. of a crystalline product melting at 43° – 44° C. was obtained. This product was trans-1-(2,5-dimethylphenyl)-2-phenylethylene, and its yield was 47 mol percent to palladium acetate.

EXAMPLE 5

5.7 grams of palladium chloride, 19 g. of sodium acetate, 3.4 g. of styrene, 340 cc. of benzene and 80 cc. of acetic acid were reacted, and the product was treated in the manner similar to Example 1. Thus 4.1 g. of trans-stilbene was obtained, with the yield of 71 mol percent to the palladium chloride.

EXAMPLE 6

Example 5 was repeated except that 19 g. of sodium acetate was replaced by 23 g. of potassium acetate. Thus 1.5 g. of trans-stilbene was obtained with the yield of 30 mol percent to the palladium chloride.

EXAMPLE 7

11.2 grams of palladium acetate, 340 cc. of benzene and 80 cc. of acetic acid were placed in a 2-liter capacity, four-necked flask which was equipped with a stirrer and reflux condenser. The system was heated under reflux for 8 hours with stirring, while ethylene gas was passed through the system at a rate of approximately 40 cc./min.

The reaction product was treated in the manner similar to Example 1, and 1.44 g. of trans-stilbene was obtained. The yield was 16 mol percent to the palladium acetate. The styrene formation was confirmed to be 4 mol percent to the palladium acetate, as the result of gas chromatographic analysis.

EXAMPLE 8

9.1 grams of styrene-palladium dichloride complex prepared by Kharash process, 340 cc. of benzene and 80 cc. of acetic acid were placed in a 2-liter capacity, three-necked flask, and reacted for 4 hours at 80° C. and atmospheric pressure, with thorough stirring. After termination of the reaction, the content of the flask was cooled, and the precipitated solid was filtered off. From the filtrate, first benzene was distilled off at atmospheric pressure, then acetic acid at a pressure reduced by a water-jet pump, and finally β-acetoxystyrene at a pressure of 5 mm Hg. The distillation residue became crystalline, which was recrystallized from ethanol to produce 1.86 g. of a crystalline product melting at 122° – 123° C. The product was confirmed to be trans-stilbene by ultraviolet and infrared absorption spectra tests and mixed examination with pure trans-stilbene. The yield was 32 mol percent to the styrene-palladium dichloride complex employed. As the side-products, 0.89 g. of β-acetoxystyrene and a minor quantity of resinous matter was obtained.

EXAMPLe 9

33.1 grams of styrene-palladium dichloride complex, 1,000 cc. of toluene and 300 cc. of acetic acid were reacted for 4 hours at 110° C. with thorough stirring in a 2-liter capacity, three-necked flask. The reaction product was treated in the manner similar to Example 8, to produce 7.2 g. of a crystalline product melting at 119° – 120° C. The product was identified to be 4-methyl-trans-stilbene, and its yield was 32 mol percent to the styrene-palladium dichloride complex employed. Also side-formation of a minor quantity of β-acetoxystyrene was observed.

EXAMPLE 10

11.0 grams of cyclohexen-palladium dichloride complex, 350 cc. of benzene and 50 cc. of acetic acid were reacted for 7 hours at 80° C., with thorough stirring in a 2-liter capacity, three-necked flask. The reaction product was treated in the manner similar to Example 8, and 0.34 g. of 1-phenyl-cyclohexene was obtained.

EXAMPLE 11

An autoclave of 200-cc. capacity was charged with 22.0 g. of palladium chloride, 120 cc. of benzene and 13 cc. of acetic acid and furthermore with ethylene until the inside pressure arose to 70 atmospheres. The inside temperature was then raised to 150° C. with stirring, and the reaction was performed for an hour. The reaction product was withdrawn from the autoclave after cooling, followed by filtration. A 4 percent aqueous solution of sodium bicarbonate was added to the filtrate until the acetic acid was neutralized. Thereafter the system was let stand, and the upper lay (benzene layer) was separated, de-watered with magnesium sulfate, and subjected to a reduced pressure distillation at approximately 200 mm Hg. Thus 0.61 g. of styrene was obtained. In the reaction, side-formation of vinyl acetate was not observed.

EXAMPLES 12 – 29

Example 1 was repeated, except that the starting materials and the reaction conditions were varied in each Example as indicated in Table 1 below, with the results given in the same table.

The products of Examples 13, 16 and 21 – 29 were determined and identified by means of gas chromatography.

We claim:

1. A process for the preparation of compounds of the formula

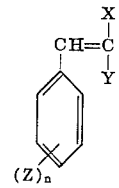

wherein
X is selected from the group consisting of hydrogen, halogen, alkyl of one to four carbon atoms, phenyl and alkylsubstituted phenyl,
Y is selected from the group consisting of hydrogen, alkyl of one to four carbon atoms, phenyl, alkyl-substituted phenyl, nitrile, alkoxy of one to four carbon atoms, halogen, alkoxycarbonyl and alkanoyloxy of two to four carbon atoms,
Z is selected from the group consisting of hydrogen, alkyl of one to 12 carbon atoms, nitro, halogen, alkoxy of one to 12 carbon atoms and alkoxycarbonyl and
n is the integer 1 or 2,
which comprises reacting a compound of the formula

wherein X and Y have the above definitions, with a compound of the formula

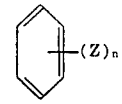

wherein Z and n have the above definitions, in the presence of a palladium salt of an aliphatic monocarboxylic acid of one to five carbon atoms or a mixture of a palladium salt selected from the group consisting of halides, sulfate and nitrate of palladium with an alkali metal salt of an aliphatic monocarboxylic acid of one to five carbon atoms.

2. The process of claim 1, in which the palladium salt is present in the reaction system in a quantity of at least fourth mol per mol of the monoethylenically unsaturated compound.

3. The process of claim 1, in which the reaction is performed in an aliphatic monocarboxylic acid of one to five carbons as solvent.

4. The process of claim 1, in which the reaction is performed at temperatures ranging from room temperature to 200° C.

5. The process of claim 1, in which the palladium salt is palladium acetate.

6. The process of claim 1, in which the monoethylenically unsaturated compound is selected from the group consisting of ethylene, propylene, vinyl fluoride, acrylonitrile, butyl vinyl ether, vinyl acetate, styrene, 4-methylstyrene, and 1,1-diphenylethylene and cyclohexane.

7. The process of claim 1, in which the aromatic compound is selected from the group consisting of benzene, toluene, xylene, monochlorobenzene, mononitrobenzene, monoethylbenzene, and anisole.

8. The process according to claim 1 wherein X, Y and Z are each hydrogen and n is 1.

9. The process according to claim 1, wherein X and Z are each hydrogen, Y is phenyl and n is 1.

10. The process according to claim 1, wherein X is hydrogen, Y is phenyl, Z is methyl and n is 1.

TABLE 1

| Example No. | Mono-ethylenically unsaturated compound | G. | Aromatic hydrocarbon | G. | Palladium salt | Cc. | Acid | G. | Reaction conditions | Cc. | Product (yield)[1] |
|---|---|---|---|---|---|---|---|---|---|---|---|
| 12 | Styrene | 4.7 | Monochlorobenzene | 8.0 | Palladium chloride | 470 | Acetic acid | 73.8 | 8 hrs. reflux boiling | 110 | o-Chlorostilbene, 0.96 g. (9.9%). m-Chlorostilbene, 1.13 g. (11.7%). p-Chlorostilbene, 1.26 g. (13.1%). |
| 13 | do | 4.7 | Mononitrobenzene | 8.0 | Sodium acetate Palladium chloride | 470 | do | 73.8 8.0 | 8 hrs., 110° C | 110 | Trans-m-nitrostilbene, 24.7%. 1,1-diphenylbutadiene, 15.5%. |
| 14 | do | 4.7 | do | 4.7 | Sodium acetate Palladium acetate | 470 | do | 73.8 11.4 | 8 hrs., 110° C | 110 | Trans-m-nitrostilbene, 0.85 g. (60.1%). |
| 15 | do | 4.7 | Monoethylbenzene | 4.7 | Palladium chloride Sodium acetate | 470 | do | 8.0 73.8 | 8 hrs., 110° C | 110 | 4-ethylstilbene, 2.08 g. (22.3%). |
| 16 | do | 4.7 | Anisole ⟨C₆H₄⟩–OCH₃ | | Palladium acetate | [2]254 | do | 3.0 | 10 hrs., reflux boiling | 140 | Methoxystilbene (mixture of o-, m-, and p-isomers), 64%. |
| 17 | 4-methylstyrene | 5.9 | Toluene | | Palladium chloride Sodium acetate Palladium chloride Sodium acetate | 400 | do | 8.9 82.0 5.7 | 8 hrs., 80–85° C | 80 | 4,4'-dimethylstilbene, 1.91 g. (36.7%). 2,4'-dimethylstilbene, 0.57 g. (11.0%). 1,1'-ditolylbutadiene, 0.47 g. (8.0%). |
| 18 | 1,1-diphenylethylene | 5.8 | Benzene | | Sodium acetate | 340 | do | 52.5 5.7 | 8 hrs. reflux boiling | 80 | 1,1,2-triphenylethylene, 3.7 g. (45%). |
| 19 | Trans-stilbene | 5.8 | do | | Sodium acetate | 340 | do | 52.5 | do | 80 | 1,1,2-triphenylethylene, 1.64 g. (20%). |
| 20 | 4-methylstyrene | 5.9 | Toluene | | Palladium acetate | 400 | do | 11.2 | 8 hrs., 80–82° C | 80 | 4,4'-dimethylstilbene, 1.70 g. (32.6%). 2,4'-dimethylstilbene, 0.61 g. (11.7%). 1,4'-ditolylbutadiene, 0.35 g. (5.9%). |
| 21 | Acrylonitrile | 4.3 | Benzene | | do | 180 | do | 2.6 | 10 hrs. reflux boiling | 120 | α-Cyanostyrene, 18%. β-Cyanostyrene, 50%. |
| 22 | Vinyl acetate | 6.9 | do | | do | 180 | do | 2.6 | do | 120 | α-Acetoxystyrene, 8%. β-Acetoxystyrene, 51%. |
| 23 | Propylene | [3]5 | do | | do | 80 | do | 1.8 | 8 hrs. reflux boiling | 20 | α-Methylstyrene, 2%. β-Methylstyrene, 8%. |
| 24 | Styrene | 4.2 | do | | Palladium chloride Sodium formate | 180 | Formic acid | 1.8 4.0 | 10 hrs. reflux boiling | 20 | Trans-stilbene, 9.3%. |
| 25 | do | 4.2 | do | | Palladium chloride Sodium butyrate | 180 | Butyric acid | 1.8 6.6 | do | 20 | Trans-stilbene, 27%. |
| 26 | do | 4.2 | do | | Palladium chloride Sodium valerate | 180 | Valeric acid | 1.8 7.4 | do | 20 | Trans-stilbene, 26%. |
| 27 | Cyclohexene | 3.3 | do | | Palladium acetate | 180 | Acetic acid | 2.3 | do | 20 | 1-phenylcyclohexene, 8.4%. |
| 28 | Butyl vinyl ether | 10.2 | do | | do | 180 | do | 2.3 | do | 120 | Butyl-β-phenyl vinyl ether, 43%. |
| 29 | Fluoroethylene | [3]5 | do | | do | 80 | do | 1.8 | do | 20 | β-Fluorostyrene, 15%. |

[1] The percentile yields are based on the palladium salt employed.
[2] Grams.
[3] Cc./min.

* * * * *